United States Patent
Otte et al.

(10) Patent No.: US 9,128,257 B2
(45) Date of Patent: Sep. 8, 2015

(54) OPTICAL COMMUNICATIONS SYSTEM AND METHOD WITH AN OPTICAL COMMUNICATION MODULE HAVING AN ACUTE ANGLE CONNECTION

(75) Inventors: Sven Otte, Hohen Neuendorf (DE); Sven Klinkicht, Berlin (DE); Alexander Eichler-Neumann, Berlin (DE)

(73) Assignee: FCI, Guyancourt (FR)

( * ) Notice: Subject to any disclaimer, the term of this patent is extended or adjusted under 35 U.S.C. 154(b) by 160 days.

(21) Appl. No.: 13/980,183

(22) PCT Filed: Jan. 18, 2012

(86) PCT No.: PCT/EP2012/000201
§ 371 (c)(1),
(2), (4) Date: Aug. 19, 2013

(87) PCT Pub. No.: WO2012/097979
PCT Pub. Date: Jul. 26, 2012

(65) Prior Publication Data
US 2013/0336617 A1    Dec. 19, 2013

(30) Foreign Application Priority Data

Jan. 18, 2011   (WO) .................. PCT/IB2011/000310

(51) Int. Cl.
*G02B 6/42*     (2006.01)
*G02B 6/46*     (2006.01)

(52) U.S. Cl.
CPC .............. *G02B 6/42* (2013.01); *G02B 6/4214* (2013.01); *G02B 6/4246* (2013.01); *G02B 6/4249* (2013.01); *G02B 6/4256* (2013.01); *G02B 6/4292* (2013.01); *G02B 6/46* (2013.01); *Y10T 29/49128* (2015.01)

(58) Field of Classification Search
CPC .......... G02B 6/42; G02B 6/46; G02B 6/4249; G02B 6/4246; G02B 6/4214; G02B 6/4292; G02B 6/4256; Y10T 29/49128
See application file for complete search history.

(56) References Cited

U.S. PATENT DOCUMENTS

| 5,515,468 | A | * | 5/1996 | DeAndrea et al. .............. 385/88 |
| 5,708,473 | A | * | 1/1998 | Mead ....................... 375/240.15 |
| 6,042,389 | A | | 3/2000 | Lemke et al. ................... 439/74 |
| 6,116,791 | A | | 9/2000 | Laninga et al. ................. 385/83 |

(Continued)

FOREIGN PATENT DOCUMENTS

| DE | 199 10 164 A1 | 9/2000 |
| EP | 0 613 032 A2 | 8/1994 |
| JP | 57-58115 | 4/1982 |

*Primary Examiner* — Akm Enayet Ullah
(74) *Attorney, Agent, or Firm* — Harrington & Smith

(57) ABSTRACT

The invention relates to an optical communications system, including an optical module, including a module motherboard provided with a substrate having an upper surface and a lower surface, an optical component on the upper surface of the substrate, the optical component being configured to submit and/or receive optical signals and being connected to electrical conductors extending through the substrate, an optical coupling module having a first light coupling port, a second light coupling port, and at least one light guiding component guiding light signals between the first and second light coupling ports, and a connector receptacle, a longitudinal axis of the connector receptacle being provided parallel or with an acute angle to the plane of the substrate, and a fiber cable connector provided on an end portion of an optical fiber cable and received in the connector receptacle.

14 Claims, 19 Drawing Sheets

(56) References Cited

U.S. PATENT DOCUMENTS

Figure 1:
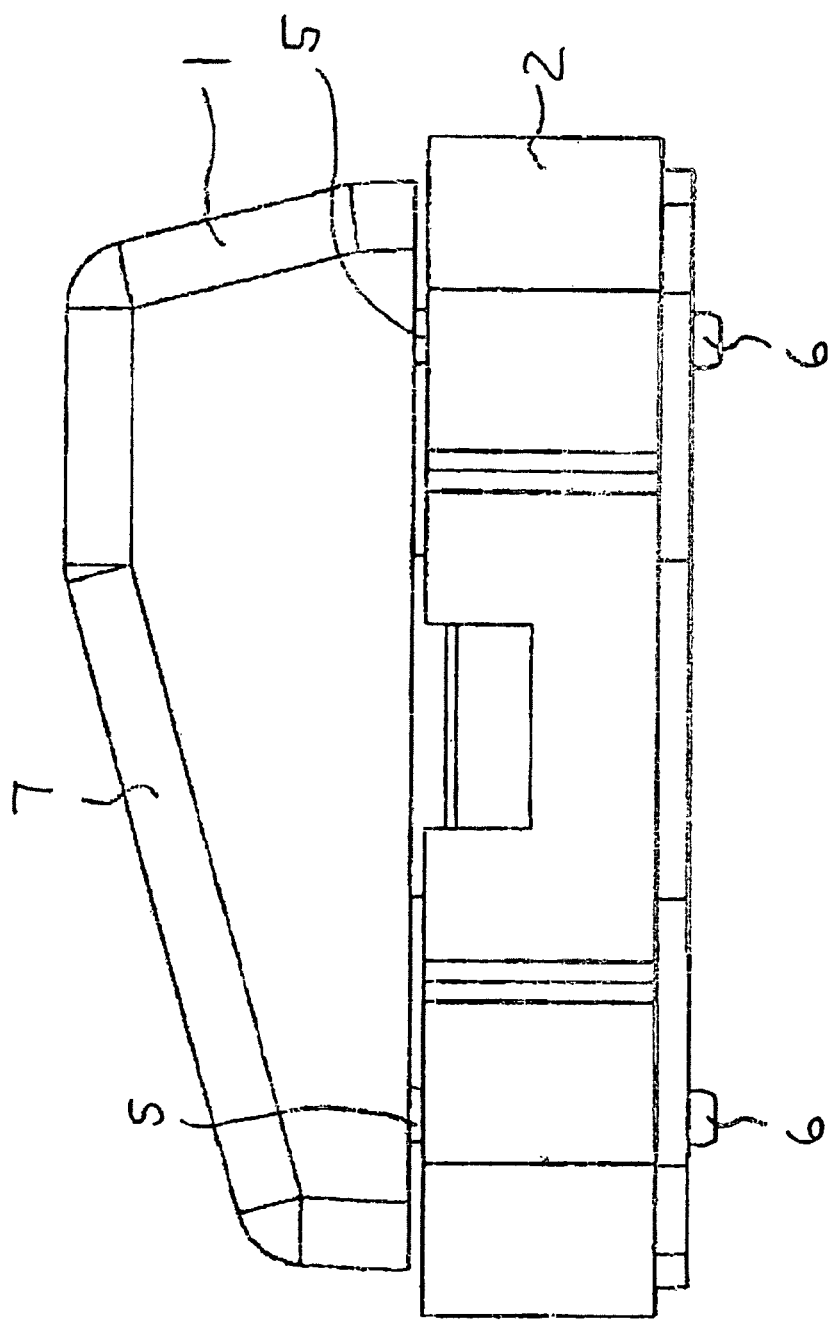

| | | | |
|---|---|---|---|
| 6,729,774 B1 * | 5/2004 | Rast et al. | 385/88 |
| 6,789,959 B1 | 9/2004 | Conn | 385/94 |
| 8,036,500 B2 | 10/2011 | McColloch | 385/14 |
| 2004/0042736 A1 | 3/2004 | Capewell et al. | 385/14 |
| 2005/0047726 A1 | 3/2005 | Hodgson | 385/89 |
| 2007/0183707 A1 | 8/2007 | Umezawa | 385/14 |
| 2008/0095506 A1 | 4/2008 | McColloch | 385/89 |
| 2008/0232737 A1 | 9/2008 | Ishigami et al. | 385/14 |

* cited by examiner

OPTICAL COMMUNICATIONS SYSTEM AND METHOD WITH AN OPTICAL COMMUNICATION MODULE HAVING AN ACUTE ANGLE CONNECTION

The invention relates to new technologies in the field of optical communications systems.

BACKGROUND

Optical communication systems are used to transmit and/or receive optical signals. Usually, the optical signals are transmitted via optical cables. In a transceivers configuration, the systems are provided with at least one optical transmitter configured to send optical signals derived from electrical signals and at least one optical receiver configured to receive optical signals which are transformed into electrical signals.

Document U.S. Pat. No. 8,036,500 B2 discloses an optical communication system in which multiple parallel optical communications modules are mid-plane mounted on a PCB (Printed Circuit Board) motherboard. Each module is connected to an optical fiber ribbon cable. The modules are configured to provide an angular coupling of the ribbon cable to the module. The module configurations aims at leaving a significant amount of space between a module and the one behind it for the purpose of providing room for the ribbon cable to exit the module without the cable being bent beyond its minimum bend radius. This feature allows the module mounting density on the motherboard PCB to be very high and allows the modules to be mounted closer to their respective hub ICs (Integrated Circuit), which increases mounting density and allows the modules to be mounted closer to their respective hub ICs. The end portion of the ribbon cable is fixed to a connector module which in turn is mounted on top of an optics system. Such module assembly is provided on a connector assembly by which the system can be mounted on the motherboard PCB.

SUMMARY OF THE INVENTION

It is the object of the invention to provide improved technologies in the field of optical communications systems provided with a sender and/or a receiver.

According to one aspect of the invention, an optical communications system is provided, comprising:
  an optical module, comprising a module motherboard provided with a substrate having an upper surface and a lower surface, an optical component disposed on the upper surface of the substrate, the optical component being configured to submit and/or receive optical signals and being connected to electrical conductors extending through the substrate, an optical coupling module having a first light coupling port, a second light coupling port, and at least one light guiding component guiding light signals between the first and second light coupling ports, and a connector receptacle, a longitudinal axis of the connector receptacle being provided parallel or with an acute angle to the plane of the substrate, and
  a fiber cable connector provided on an end portion of an optical fiber cable and received in the connector receptacle, thereby, optically coupling a plurality of optical fibers of the optical fiber cable to the first or second light coupling ports.

According to another aspect of the invention, an optical module is provided, comprising a motherboard comprising a substrate having an upper surface and a lower surface, an optical component disposed on the upper surface of the substrate, the optical component being configured to submit and/or receive optical signals and being connected to electrical conductors extending through the substrate, an optical coupling module having a first light coupling port, a second light coupling port, and at least one light guiding component guiding light signals between the first and second light coupling ports, and a connector receptacle configured to receive a fiber cable connector provided on an end portion of an optical fiber cable, thereby, coupling a plurality of optical fibers to the first or second light coupling ports, a longitudinal axis of the connector receptacle being provided parallel or with an acute angle to the plane of the substrate.

According to still another aspect of the invention, a method for mounting an optical communications system is provided, the method comprising steps of:
  providing an optical module, comprising a module motherboard provided with a substrate having an upper surface and a lower surface, an optical component disposed on the upper surface of the substrate, the optical component being configured to submit and/or receive optical signals and being connected to electrical conductors extending through the substrate, an optical coupling module having a first light coupling port, a second light coupling port, and at least one light guiding component guiding light signals between the first and second light coupling ports, and a connector receptacle, a longitudinal axis of the connector receptacle being provided parallel or with an acute angle to the plane of the substrate,
  providing a fiber cable connector provided on an end portion of an optical fiber cable, and
  receiving the fiber cable connector in the connector receptacle, thereby, optically coupling a plurality of optical fibers of the optical fiber cable to the first or second light coupling ports, the fiber cable connector being received in the connector receptacle in a position in which a longitudinal axis of the fiber cable connector is provided parallel or with an acute angle to the plane of the substrate.

The optical communication system is configured to transmit and/or receive optical signals via one or more optical channels. For transmission of optical signals electrical signals are transformed into optical signals by an optical component provided with a transmitter. In the case of receiving optical signals in an optical communication, the optical signals received are transformed into electrical signals by an optical component provided with a receiver. If the optical module provided in the optical communication system comprises one or more optical components providing the functionality of the transmitter and the receiver as well, the optical module may referred to as an optical transceiver module, otherwise there is an optical transmitter module or an optical receiver module. In a preferred embodiment, the optical communication system is configured to parallel transmit and/or receive optical signals via a plurality of optical channels.

Depending on the configuration of the optical module, the first or second light coupling ports may provided as a light input, a light output or a light input/output (I/O). The light coupling ports may also be referred to as light coupling terminals.

Preferably, the fiber cable connector is releasable received in the connector receptacle.

Due to an angle of about 0 degree to smaller than 90 degree ($0° \leq angle < 90°$) provided between the longitudinal axis of the connector receptacle and the plane of the substrate of the module motherboard, the fiber cable connector maybe guided along a direction also having such angle to the plane of the substrate on its way into the connector receptacle and on its way departing from the connector receptacle. In a preferred embodiment, the angle ranges from about 0 to about 30 degree, preferably from about 0 to about 20 degree, and further preferably from about 0 to about 15 degree. Preferably, the lower limit for the angle is about 5 degree.

The connector receptacle may be provided with a slot portion configured to receive the fiber cable connector. A longitudinal slot axis is in line with the longitudinal axis of the connector receptacle.

In a preferred embodiment, the acute angle is between about 5° and about 30° to the plane of the substrate.

The fiber cable connector may be provided as a ferrule connector. In a preferred embodiment, the fiber cable connector is a standard fiber cable connector. In this embodiment a standardized fiber cable connector is connected to the optical module. For example, a so-called MT-type ferrule connector may be applied.

The fiber cable the end of which is received in the fiber cable connector, preferably, is a ribbon type optical fiber cable.

The optical module may be referred to as an assembly or combination of a connector module part and an optic module part, the optic module part comprising the optical coupling module or unit, and the connector module part comprising the connector receptacle.

In a preferred embodiment, the connector receptacle comprises a module receptacle provided in the optical coupling module. For example, a module slot may be provided in the optical coupling module for receiving at least some front part of the fiber cable connector.

A further development of the invention a housing is provided, the fiber cable connector being provided with a fiber cable extension support extending from the housing. At least the optical coupling module is received in the housing. The fiber cable extension support extending may rest on the housing. It may extend through a housing aperture through which the optical fiber cable is extending.

In a preferred embodiment, the fiber cable connector is fixed by a latching mechanism in the connector receptacle. Preferably, the latching mechanism comprises one or more resilient actuator elements for manually operating the latching mechanism. The one or more resilient actuator elements may be provided on the fiber cable extension support.

In another preferred embodiment, at least a coupling module portion extending between the first and second light coupling ports in the optical coupling module is provided as molded module part. Also, the optical coupling as whole may be provided as molded module.

In an advanced embodiment of the invention, the molded module part comprises an integrally plurality of optical lenses provided at least one of the first and the second light coupling ports. In another embodiment, there is an integrally single optical lens, preferably in case of an optical communication system provided with a single optical channel.

Preferably, the at least one light guiding component comprises a light reflecting component provided with an obtuse light reflection angle (angle between incoming light beam and reflected light beam), therefore, the light reflection angle being greater than 90 degree, but smaller than 180 degree.

A further development of the invention is that a plurality of optical lenses is provided in front of fiber end surfaces in the fiber cable connector. Especially in case of an optical communication system with just a single optical channel, only a single optical lens may be provided. In an alternative embodiment, the fiber cable connector is free of optical elements, especially lenses, in front of the fiber end surfaces.

In a further preferred embodiment, fiber end surfaces in the fiber cable connector are one of polished fiber front end surfaces and broken fiber front end surfaces.

In still a further preferred embodiment, there is a connector assembly having an upper mounting surface and a lower mounting surface and a connector assembly motherboard receiving at least one electronic component assigned to the at least one optical component of the optical module and electrically connected to conductors on the upper and/or the lower mounting surfaces, the optical module being provided on the upper mounting surface and electrically connected to the conductors on the upper mounting surface.

Preferably, the connector assembly comprises an assembly connector providing the upper mounting surface and an assembly receptacle providing the lower mounting surface and being releasable connected to the assembly connector. In a preferred embodiment, the assembly connector and the assembly receptacle are releasable connected by a pin plug connection.

In still another embodiment, the connector assembly comprises a Meg-Array assembly. A design concept of such Meg-Array is disclosed, for example, in the document U.S. Pat. No. 6,042,389 the disclosure of which is incorporated here by reference.

The optical communication system may be configured to send and receive optical signals in an operation mode of up to 120 Gb/s.

DESCRIPTION OF PREFERRED
EMBODIMENTS OF THE INVENTION

Figure 2:
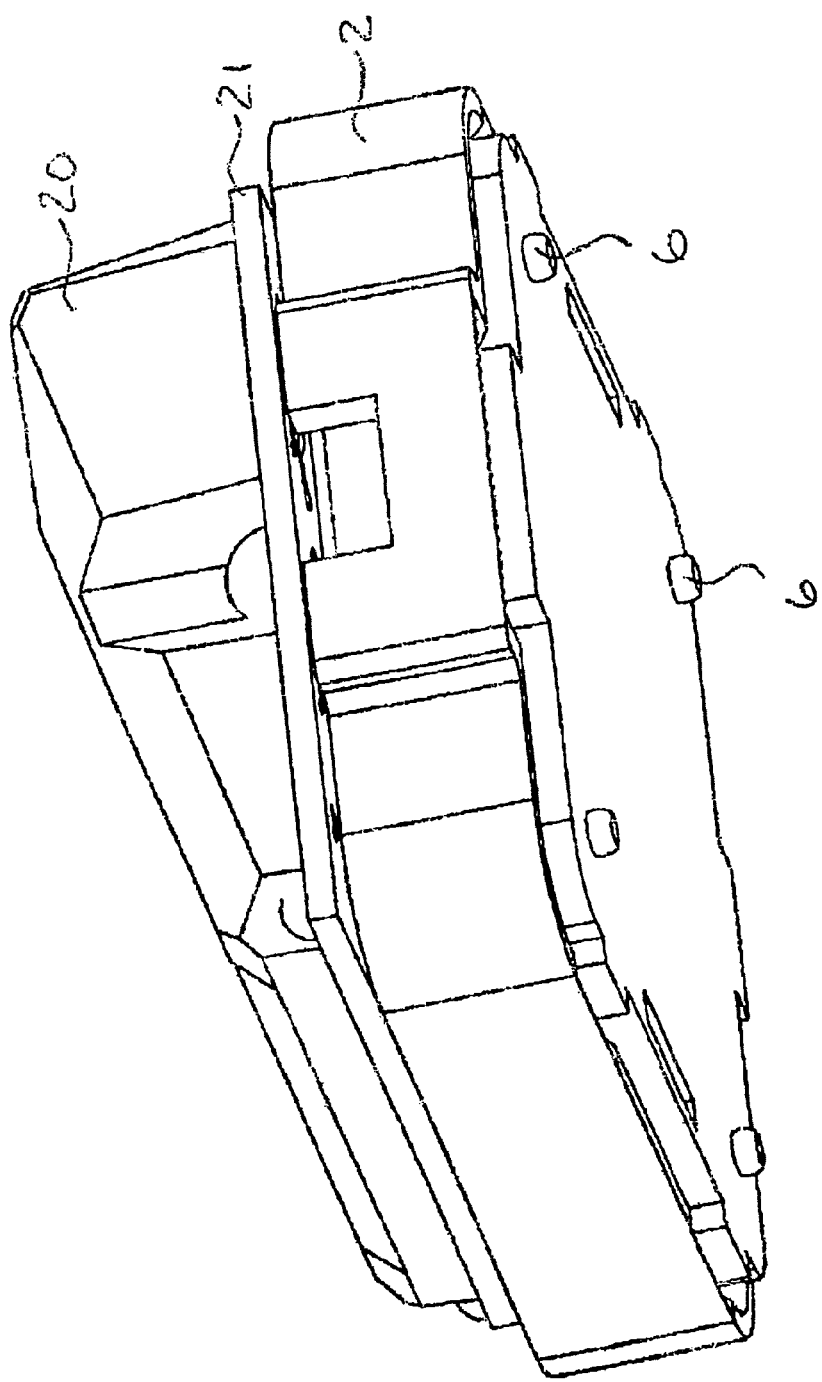
Figure 3:
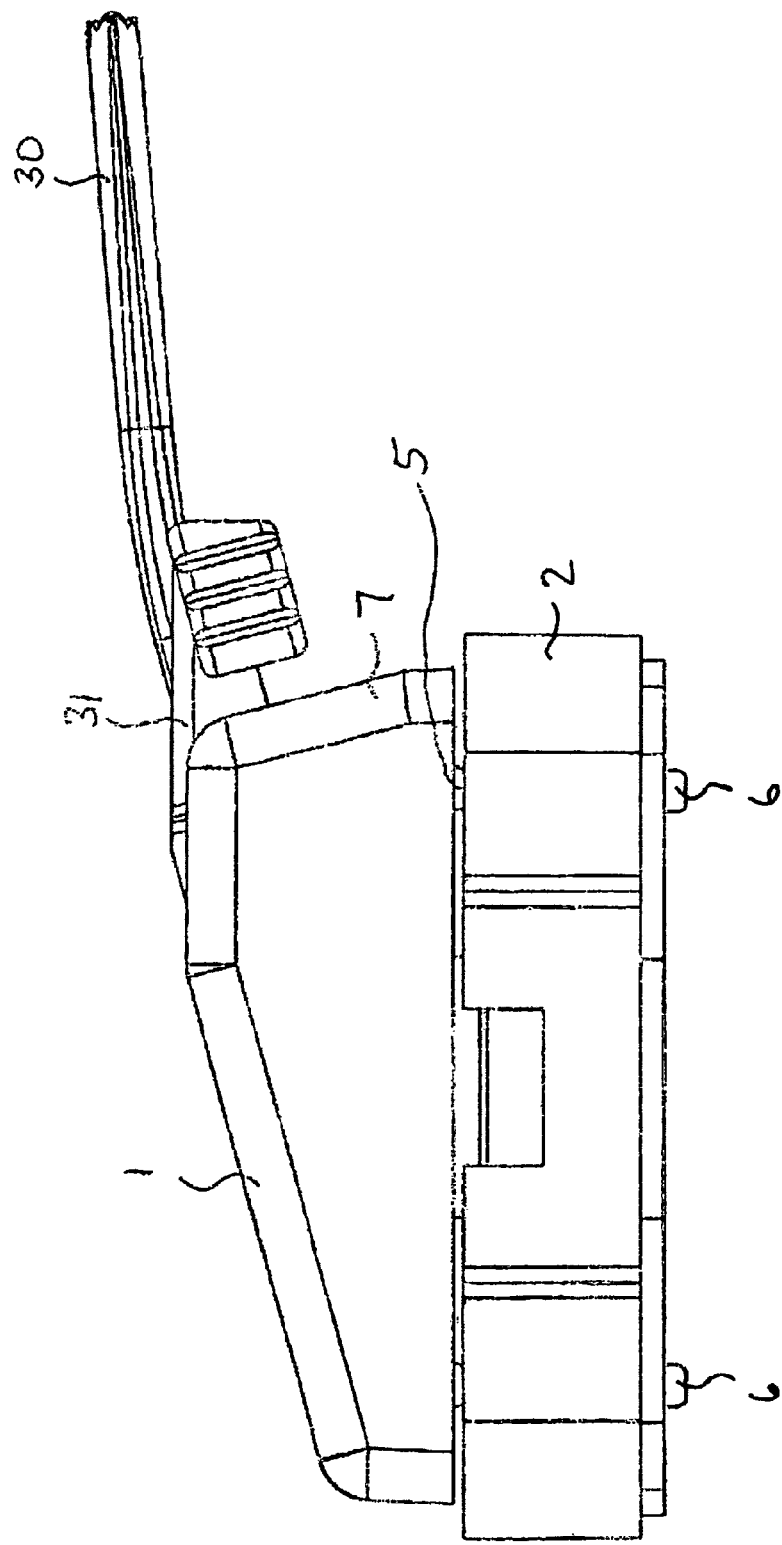
Figure 4:
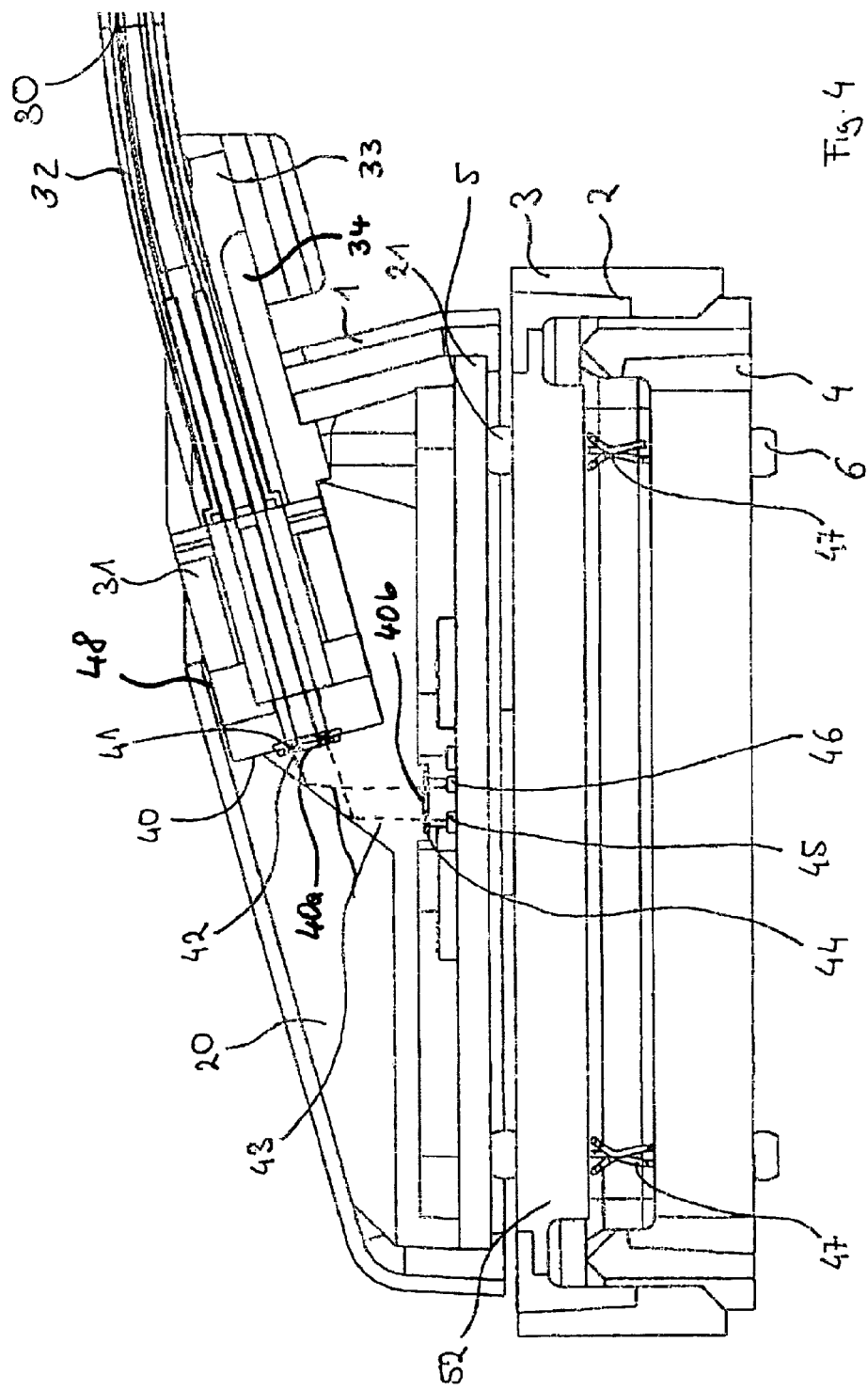
Figure 5:
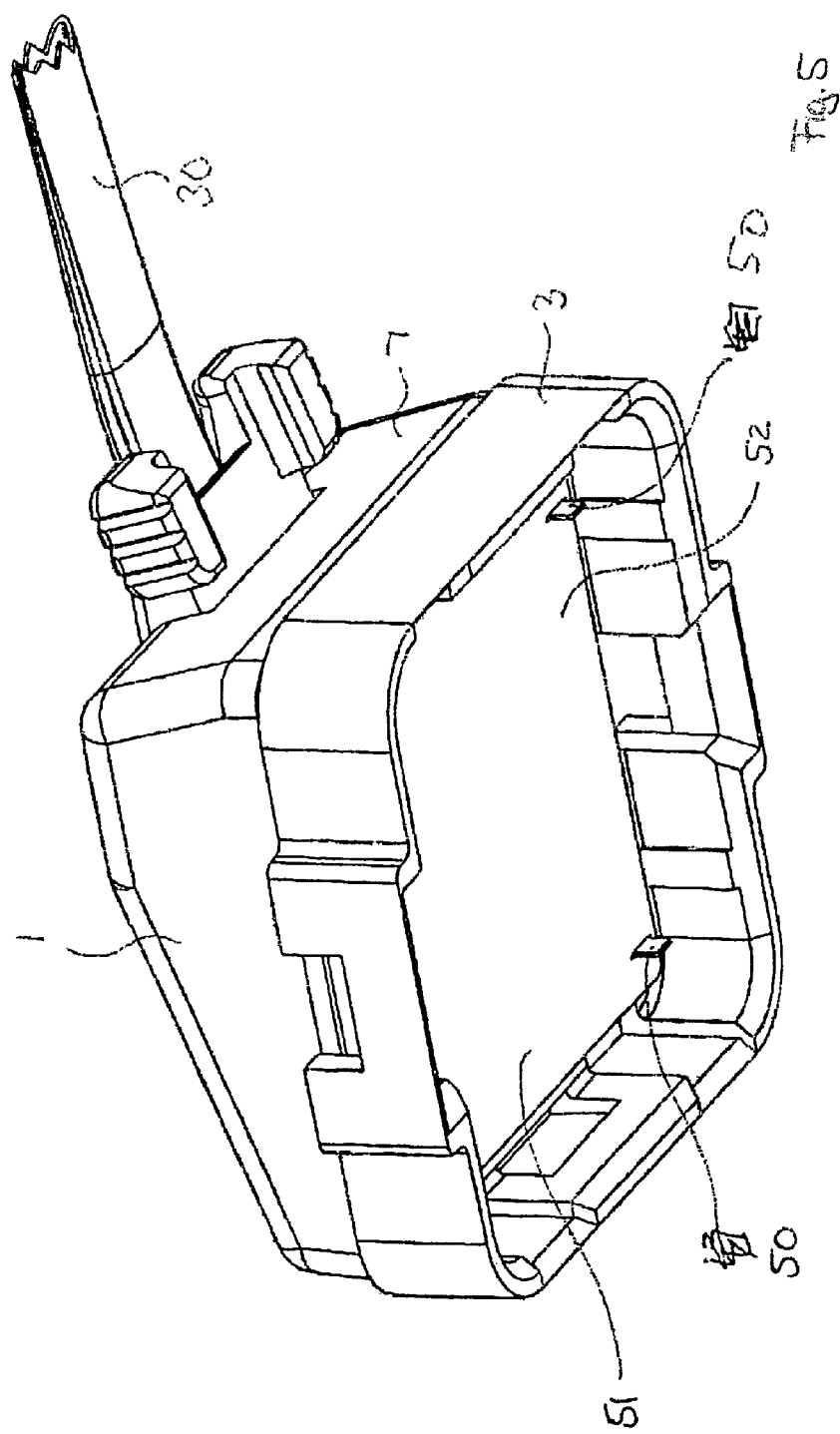
Figure 6:
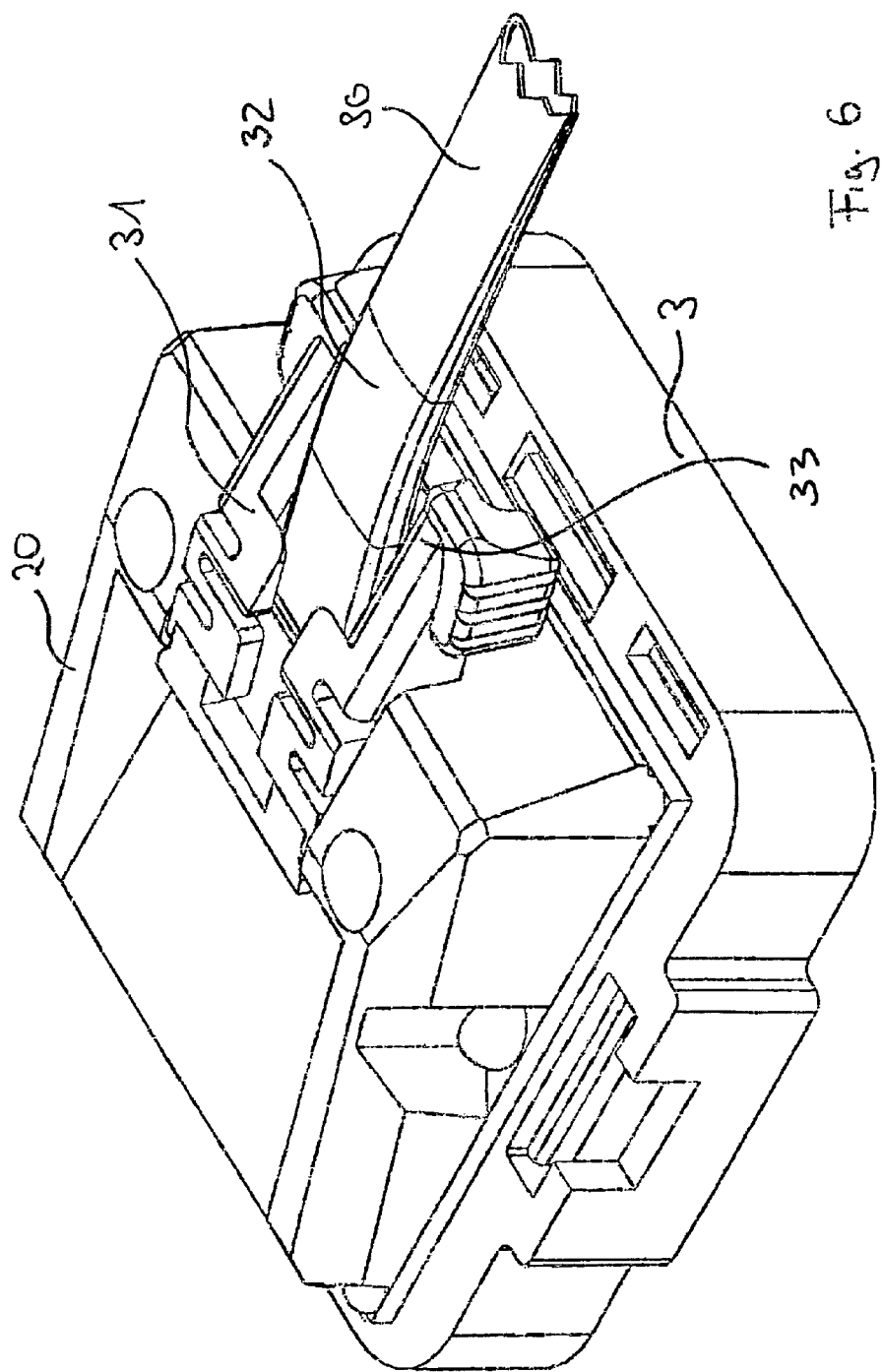
Figure 7:
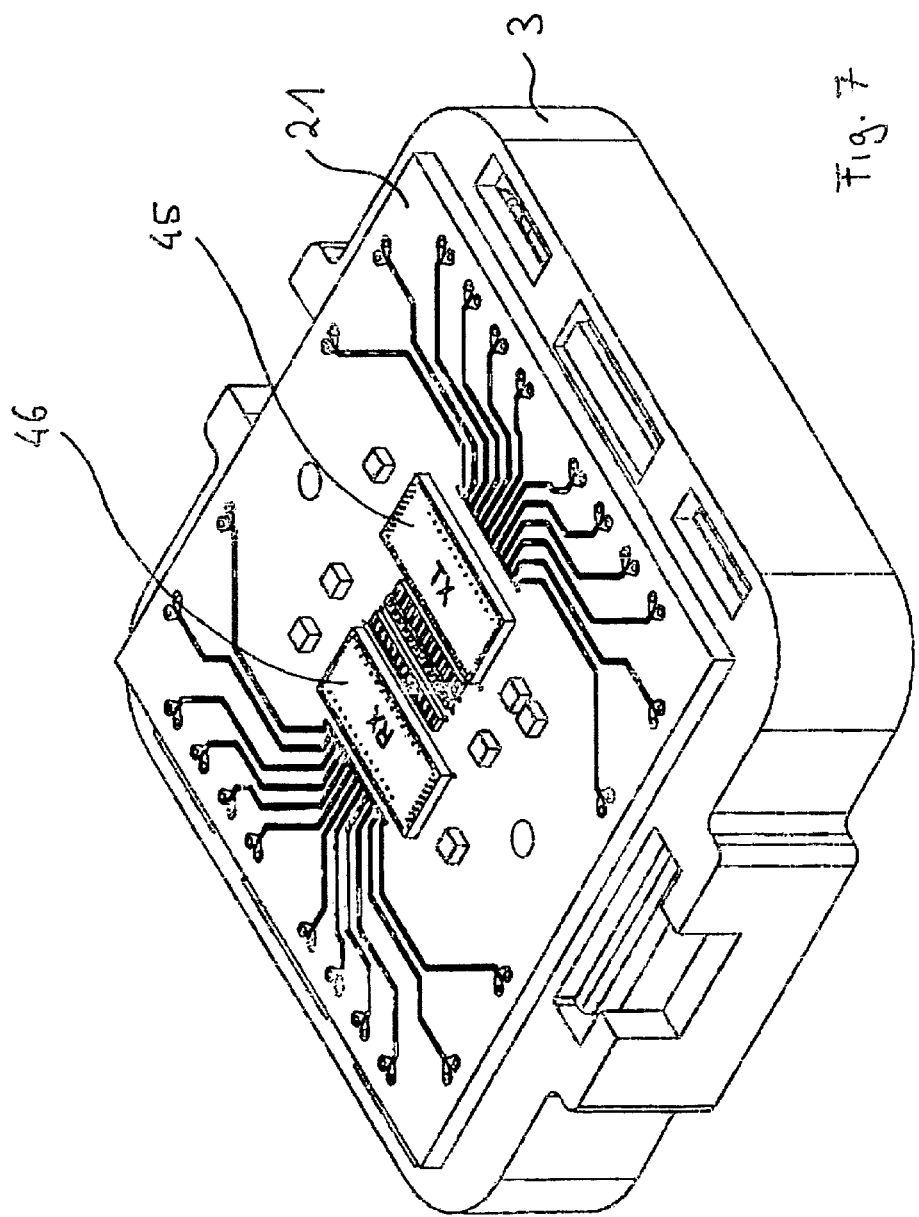
Figure 8:
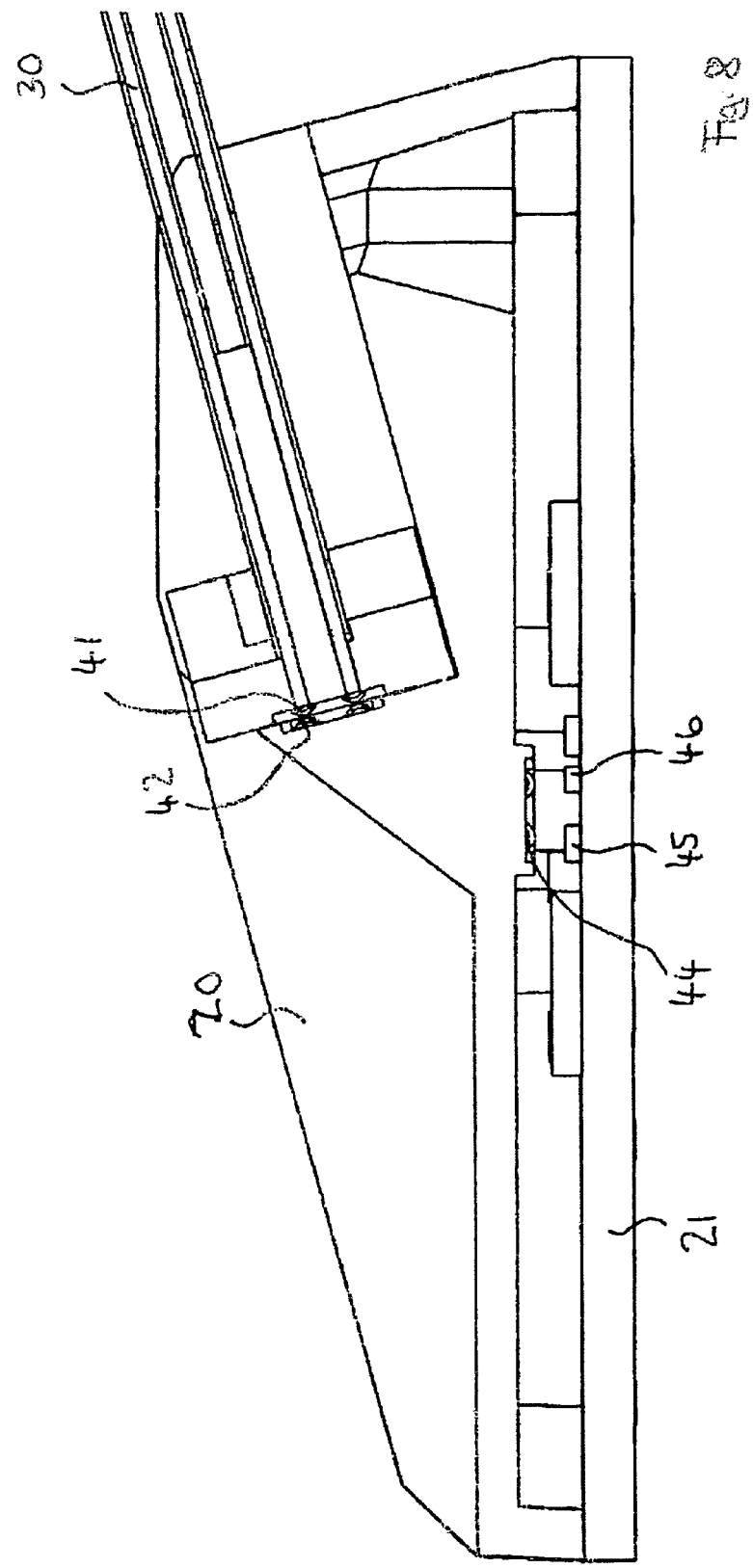
Figure 9:
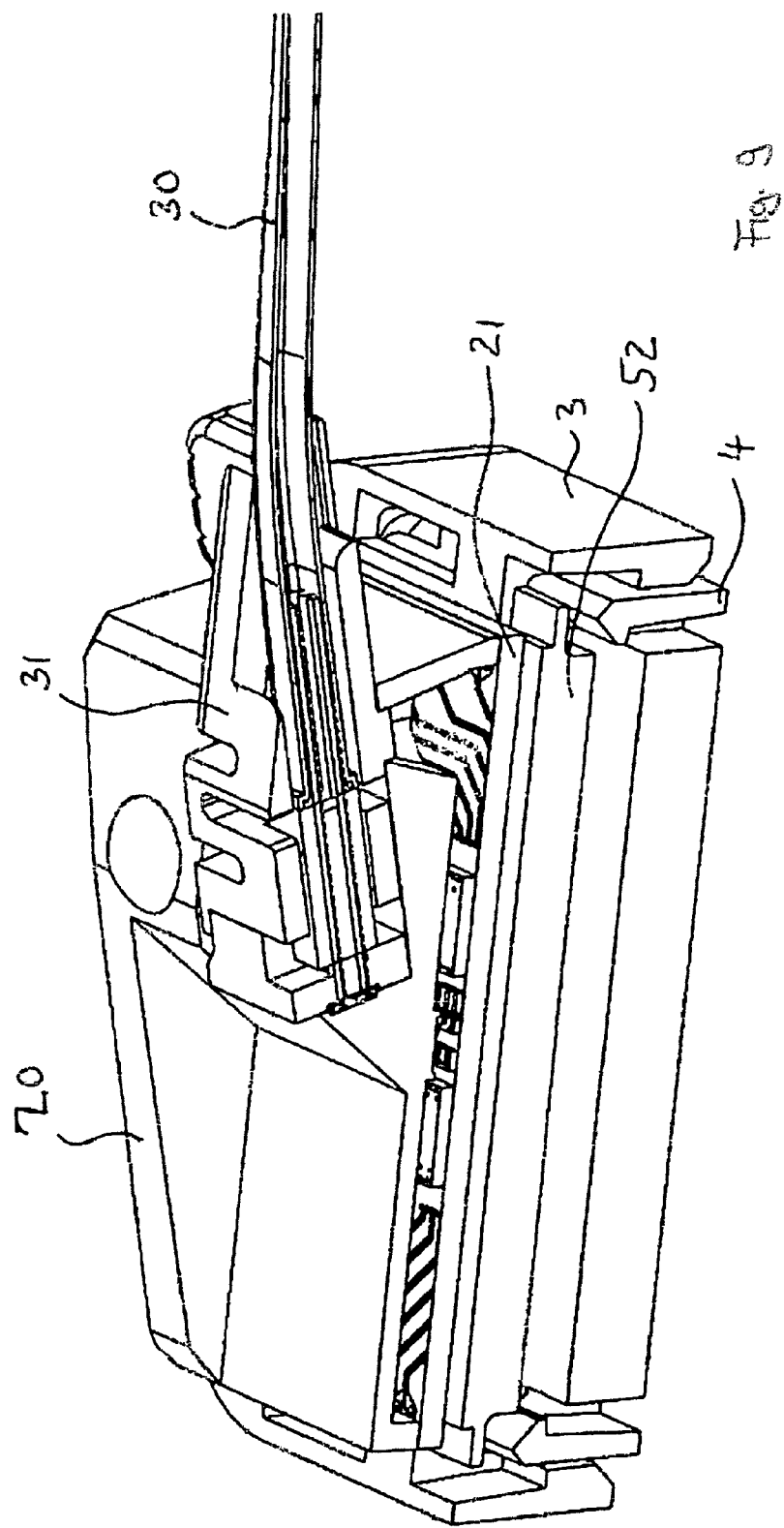
Figure 10:
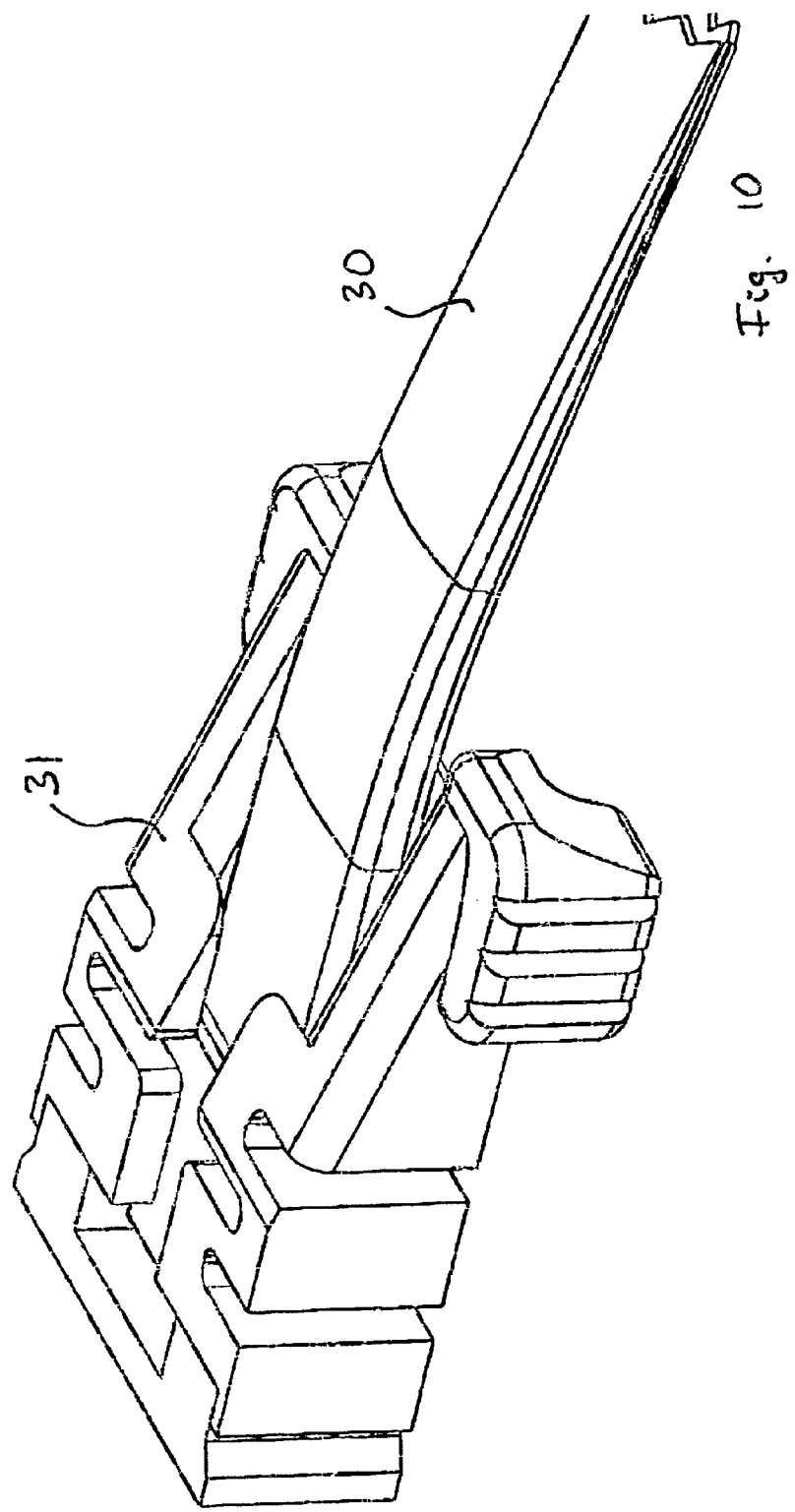
Figure 11:
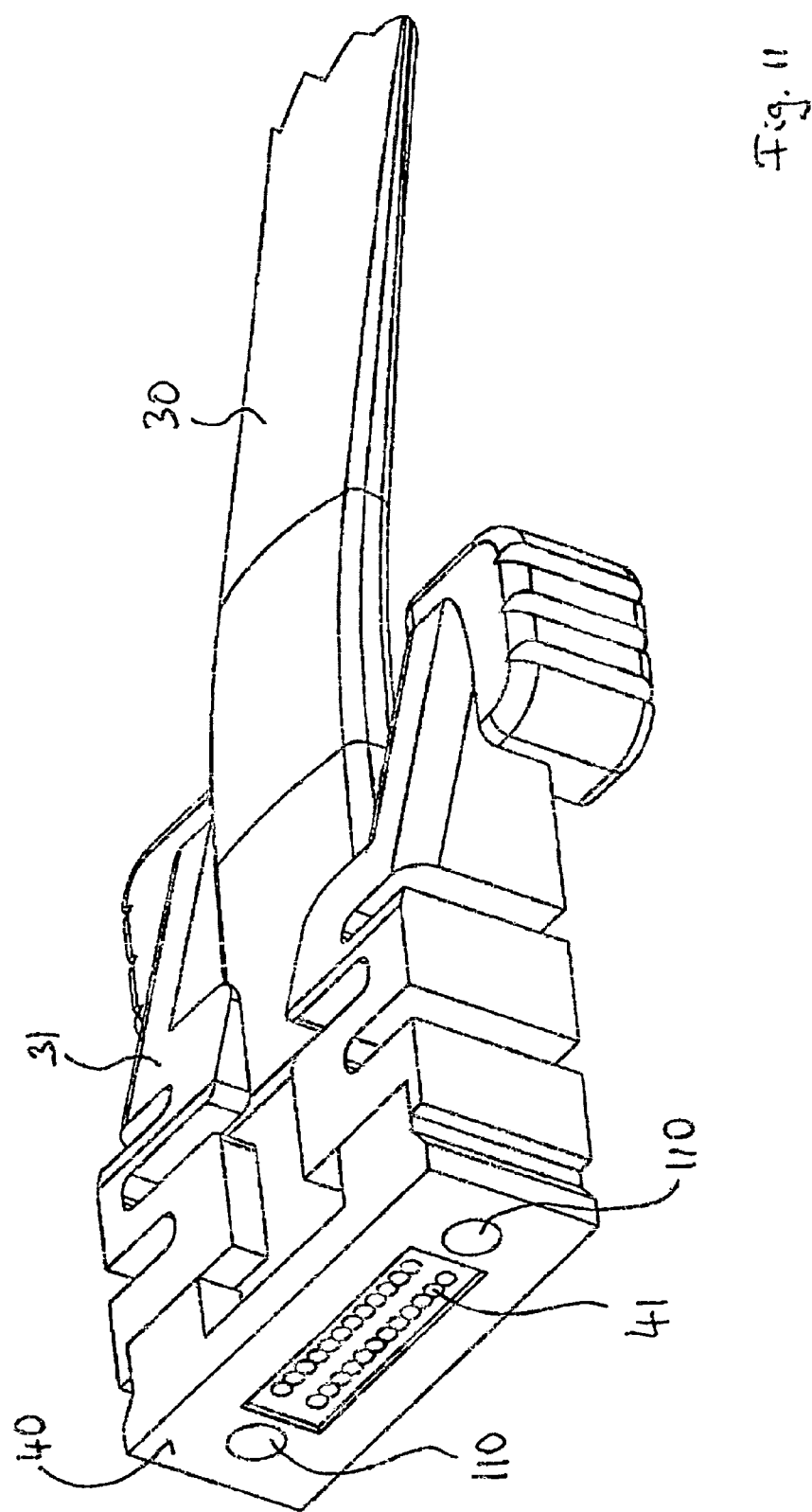
Figure 12:
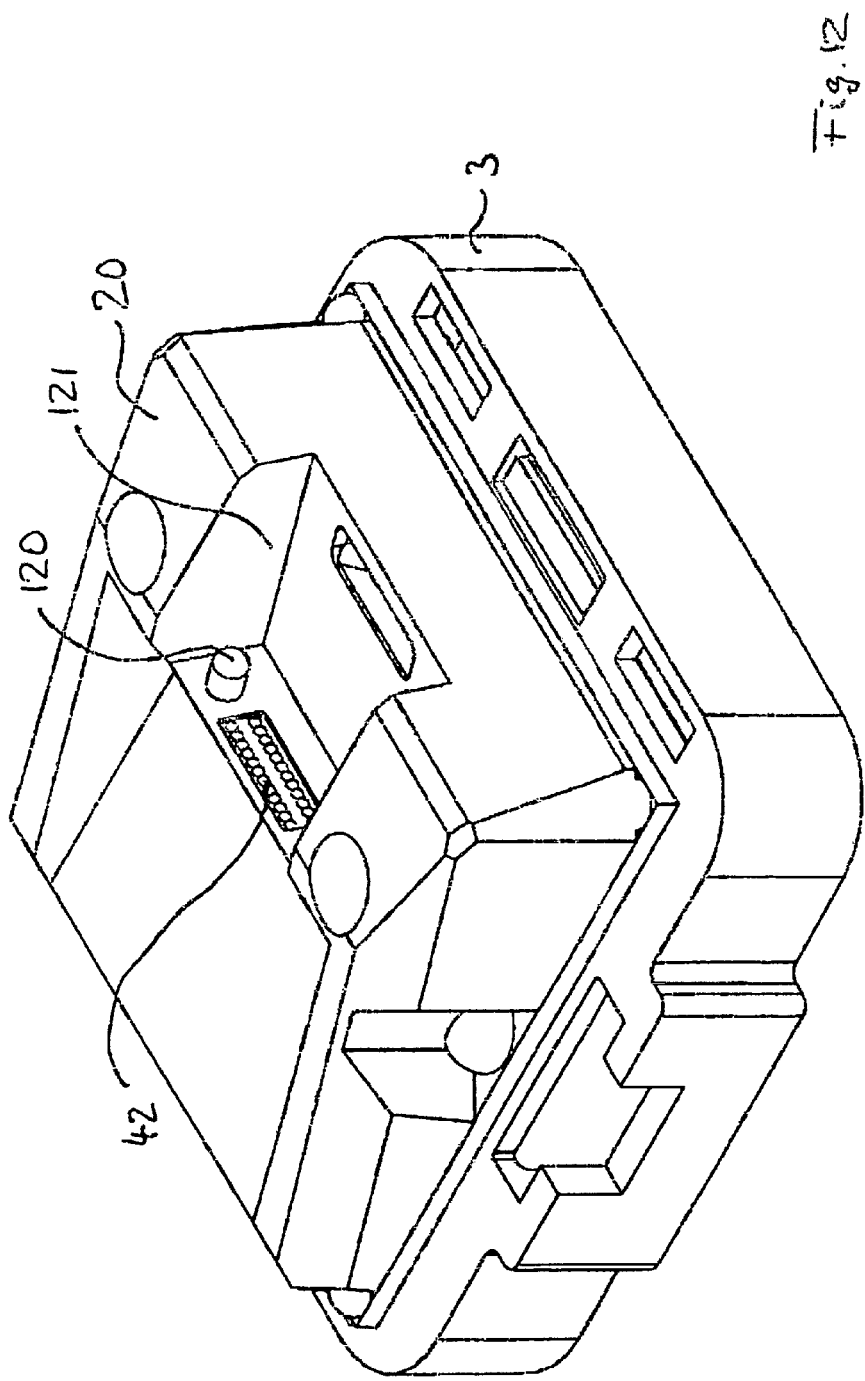
Figure 13:
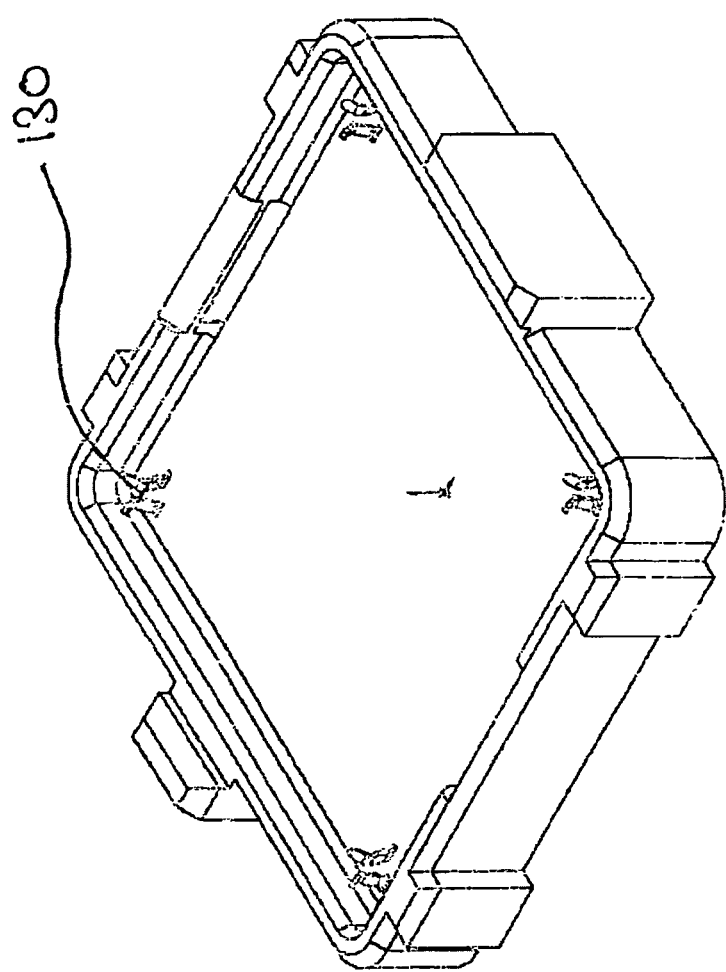
Figure 14:
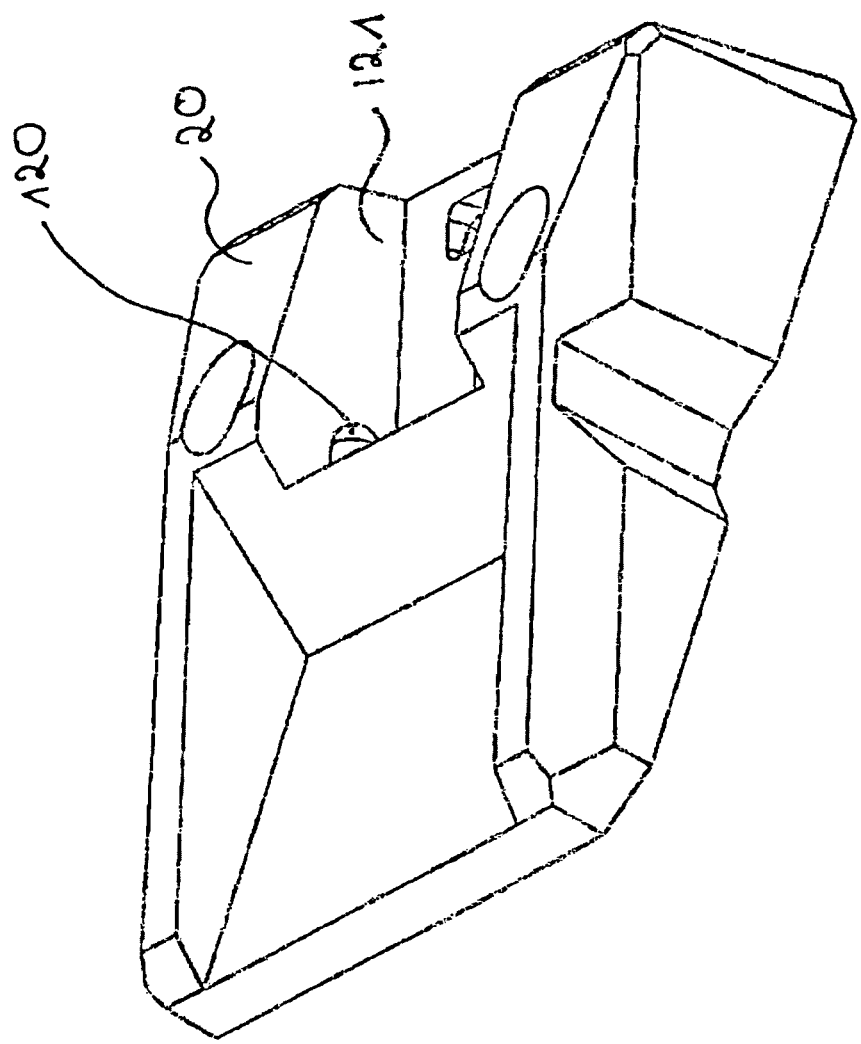
Figure 15:
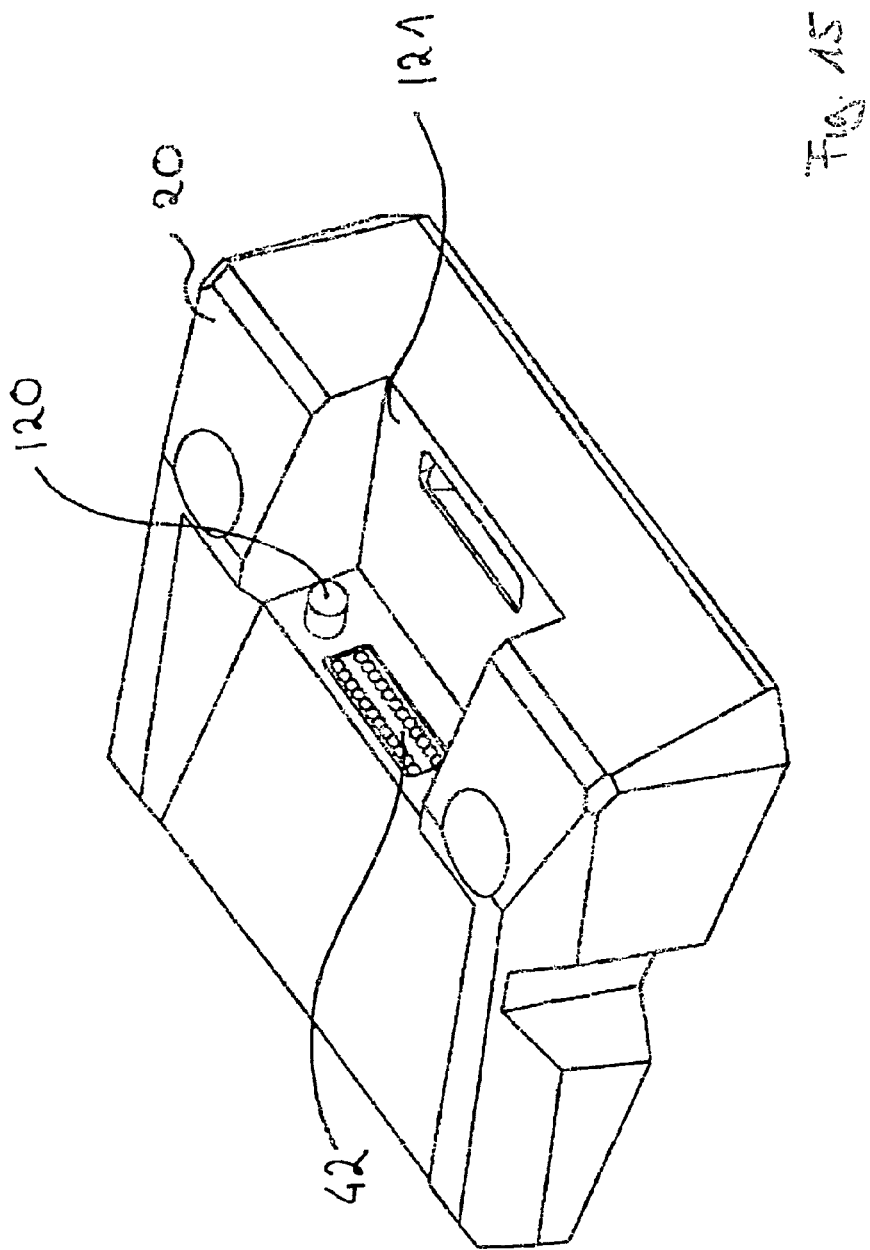
Figure 16:
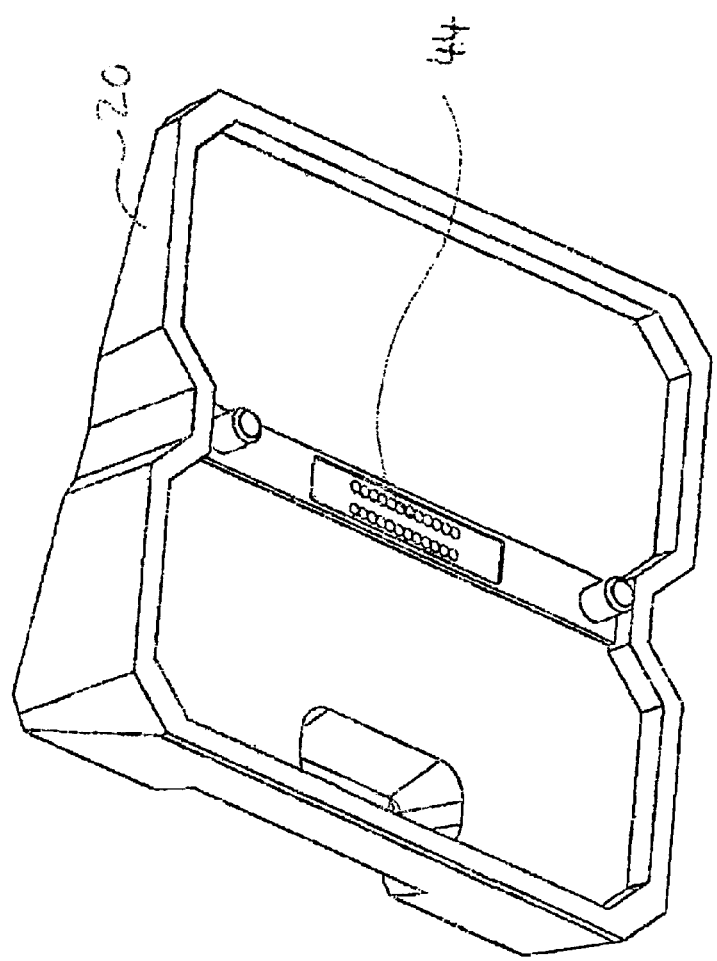
Figure 17:
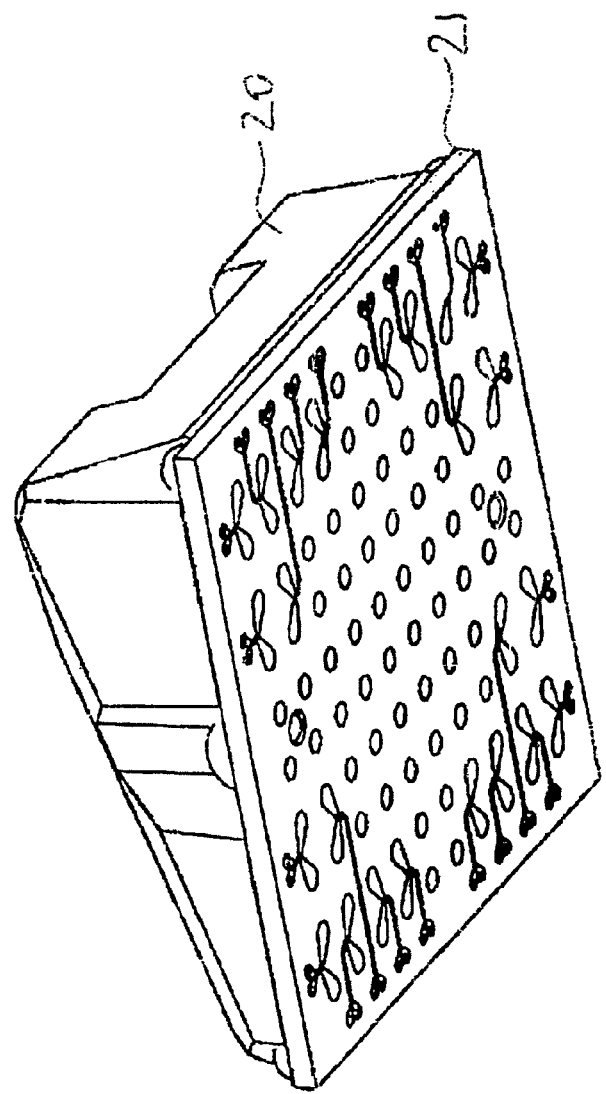
Figure 18:
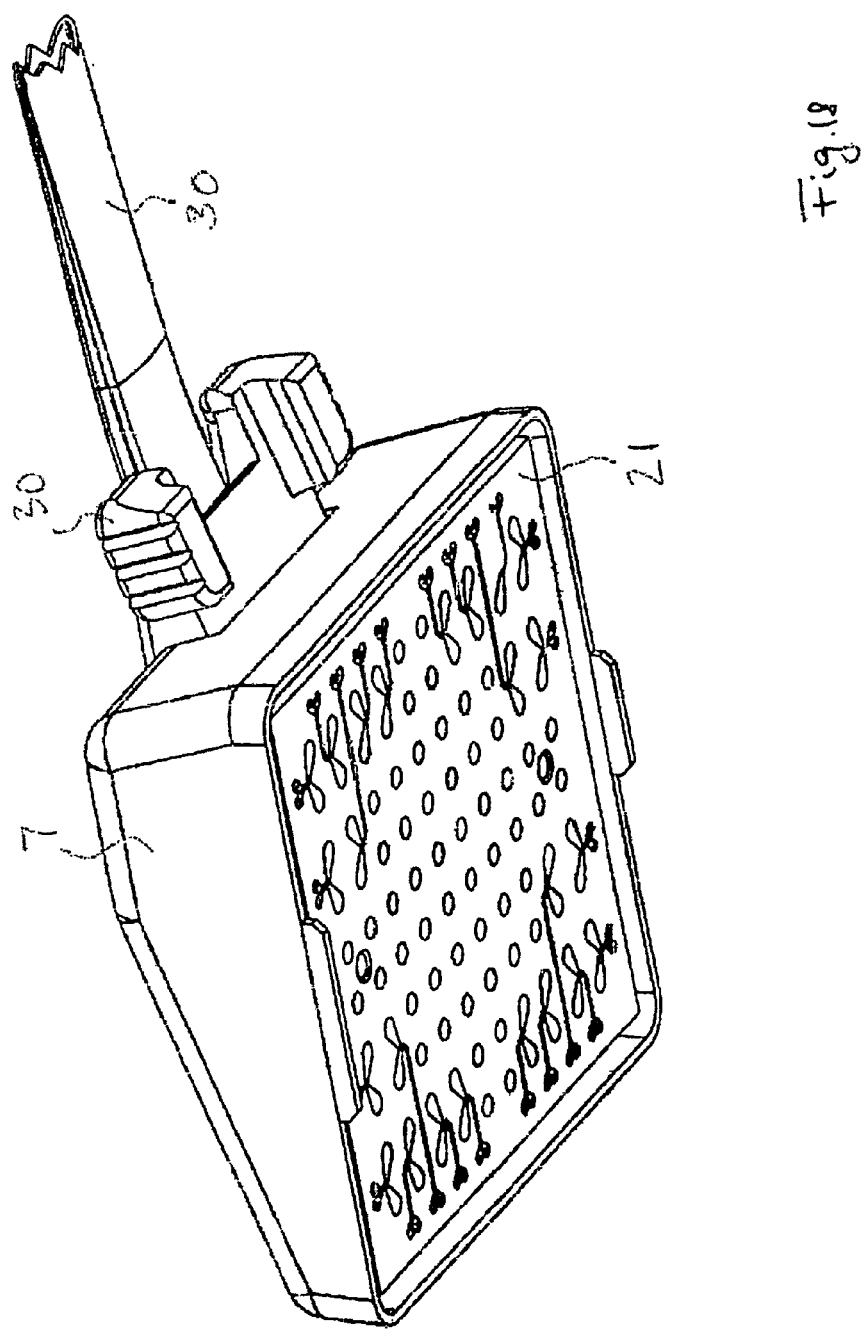
Figure 19:
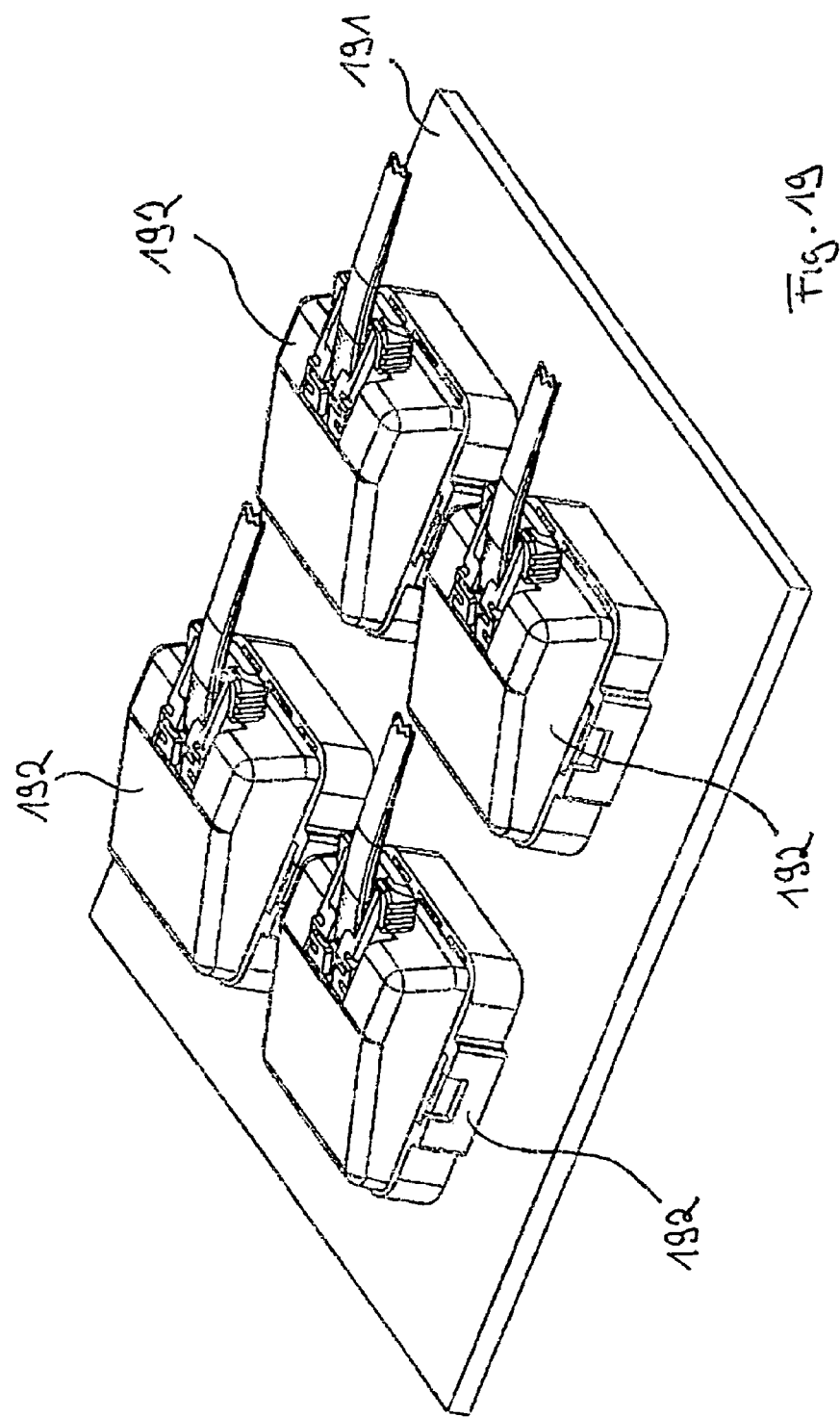

In the following, the invention will be described in further detail, by way of example, with reference to different embodiments. The figures show:

FIG. 1 a front view of an assembly comprising an optical module provided on a connector assembly, FIG. 2 a perspective representation of the optical module in FIG. 1, FIG. 3 a front view of the assembly in FIG. 1 wherein a fiber cable is connected via a ferrule connector, FIG. 4 a section view of the assembly in FIG. 3, FIG. 5 a bottom perspective view of the assembly in FIG. 1, wherein the optical module together with the connector is separated from the receptacle of the connector assembly, FIG. 6 a perspective top view of the assembly in FIG. 5, FIG. 7 a top perspective view of the receptacle of the connector assembly on which the printed circuit board is provided, FIG. 8 a section view of the optical module provided in the assembly in FIG. 3, FIG. 9 a perspective section view of the assembly in FIG. 1, wherein a top cover is removed, FIG. 10 a perspective view of a connector of the ferrule type connecting a fiber cable to the optical module, FIG. 11 another perspective view of the connector in FIG. 10, FIG. 12 a perspective view of an assembly comprising a connector of a connector assembly and an optical module provided thereon, FIG. 13 a perspective view of a receptacle of the connector assembly, FIG. 14 a perspective view of an optical coupling unit, FIG. 15 another perspective view of the optical coupling unit in FIG. 14, FIG. 16 another perspective view of the optical coupling unit in FIG. 14 from the bottom, FIG. 17 a perspective view of an optical module comprising an optical coupling unit provided on a printed circuit board, FIG. 18 a perspective view of an assembly comprising a connector which is connected to a fiber cable and plugged into a receptacle provided on an optical module, and FIG. 19 a perspective view of an assembly comprising a plurality of optical communication systems provided on a motherboard.

FIG. 1 shows a front view of an optical communication system comprising an optical module 1 provided on a connector assembly 2. The optical module 1 being connected to the connector assembly 2 by an electrical connection, e.g. a solder connection, is provided with an optical transceiver, and, therefore, may be referred to as an optical transceiver module. In other embodiments, the optical module 1 may be provided with only an optical transmitter or with only an optical receiver.

The connector assembly 2 may be implemented, for example, by a so called Meg-Array. A basic design concept of such Meg-Array is disclosed, for example, in the document U.S. Pat. No. 6,042,389 the disclosure of which is incorporated here by reference. In one embodiment, the Meg-Array has an array of 100 input/output (I/O) pins that plug into a 100-pin ball grid array (BGA). The Meg-Array is, in turn, secured to a host PCB (Printed Circuit Board) motherboard (not shown). The connector assembly 2 is provided with a connector 3 (male or top part) separable plugged into a receptacle 4 (female or bottom part) which may also referred to as plug (for further details, see FIG. 4 below).

The optical module 1 is electrically connected to the connector assembly 2, namely to the connector 3, by electrical connections 5 which, in the embodiment shown in FIG. 1, are provided by solder balls. The optical module 1 can be separated from receptacle 4 together with the connector 3 by detaching the connector 3 from the receptacle 4. The connector assembly 2, in turn, is connectable to the motherboard by further electrical connections 6 which may be provided as a so-called ball grid array.

In another embodiment (not shown), the optical module 1 may be electrically connected directly to the motherboard via the electrical connections 5. In a preferred method, this may be achieved by providing solder pads on the motherboard. In a second preferred method, a land grid array may be present on the motherboard which fits to the optical module and in which the optical module may be inserted or connected.

In FIG. 1, the optical module 1 is depicted with a top cover 7 providing a housing and covering an optical coupling unit (see, for example, FIG. 2). The top cover 7 provides a mechanical shielding for components of the optical module 1. In a preferred embodiment, the top cover 7 is configured to provide additionally an electromagnetic shielding for components of the optical module 1 provided within the top cover 7. For example, the top cover 7 may be made of a metallic material.

FIG. 2 shows a perspective view of the optical communication system in FIG. 1, wherein the top cover 7 is taken away, thereby exposing an optical coupling unit 20 of the optical module 1. The optical coupling unit 20 is located on a printed circuit board 21 carrying optical components, especially a transmitter and a receiver (for details, see FIG. 7 below). The optical coupling unit 20 providing one or more optical components of the optical module 1 is arranged on the printed circuit board 21 by using one or more locating pins (not shown). The optical coupling unit 20 may be fixed to the printed circuit board 21, for example by gluing. In addition or alternatively, the top cover 7 may be fixed to the printed circuit board 21, for example by gluing.

FIG. 3 shows a front or side view of the optical communication system in FIG. 1, wherein an optical fiber cable 30 is coupled to the optical module 1 via a connector 31 which is implemented as a ferrule connector in the embodiment shown. The optical fiber cable 30 is of the ribbon type.

FIG. 4 shows a section view of the optical communication system in FIG. 1 or 3 with the connector 31 plugged in.

On a front face 40, the connector 31 is provided with lenses 41 which may be referred to as ferrule lenses and are located opposite of first coupling unit lenses 42.

In one embodiment, the lenses 41 are provided in front of polished front end faces of the optical fibers. As an alternative, the ferrule lenses 41 may be assigned to non-polished front end faces of the optical fibers. For example, such unpolished front end faces of the optical fibers may be produced by just breaking the fibers after slitting the outer surface of the fiber. Preferably, in such design there is no subsequent machining of the broken front end portion of the optical fiber. In still another embodiment, a (ferrule) connector is provided comprising optical fibers having a broken front end portion, but no ferrule lenses. Such design is a more simplified ferrule connector for optically coupling optical signals.

Important to note, the embodiments of a connector provided with the unpolished front end faces may be used in different optical modules such as the optical transmitter module, the optical receiver module, or the optical transceiver module disclosed here. There is a ferrule connector comprising front end portions of a plurality of optical fibers, wherein the front end faces are unpolished, especially provided as so-called broken fiber front end.

Referring still to FIG. 4, dashed lines depict an optical light path 43 between a first light coupling port 40a provided with the first coupling unit lenses 42 and a second light coupling port 40b provided with second coupling unit lenses 44 located opposite to optical elements, especially a transmitter 45 and a receiver 46, provided on the printed circuit board 21, preferably made of a ceramic material. Another material which may be used is glass or FR4 or other material for electrical printed circuit boards. The printed circuit board may consist of one, two or more electrically conductive planes. The optical light path 43 is bended. The bended light path provided with bending from a vertical direction to a horizontal direction allows for a departure angle (angle between the plane of the circuit board 21 and the longitudinal axis or direction of the connector 31) may range from about 0 to about 30 degree, preferably from about 0 to about 20 degree, and further preferably from about 0 to about 15 degree. Preferably, the lower limit for the angle is about 5 degree.

Such departure or tilt angle is equal to the angle which has the longitudinal axis of a connector receptacle 48 receiving the connector 31. During assembling the system, on its final way into the connector receptacle 48 the connector 31 is guided along a direction which is parallel to the longitudinal axis of the connector receptacle 48. Also, the connector 31 can be removed from the connector receptacle 48 along this direction. This is achieved by providing the connector receptacle 48 with a slot design.

In FIG. 4, it is also shown that there is a bending portion 32 of the optical fiber cable 30 located at or in the vicinity to a distal end 33 of the connector 31. By the bending in the bending portion 32 the original departure angle provided in the connector 31 is (further) decreased. The optical cable 30 is bent down. The distal end 33 is provided on a cable support extension 34 of the connector 31 extending from the housing providing cover 7 (see, for example, also FIG. 5).

For electrical connection between the connector 3 and the receptacle 4, a pin connection 47 is provided in a separable configuration.

FIG. 5 illustrates a bottom perspective view of the optical communication system in FIG. 1, wherein the optical module 1 together with the connector 3 is separated from the receptacle 4. Pin connection elements 50 being part of the pin connections 47 in FIG. 4 are provided on the bottom side 51 of a connector assembly board 52.

FIG. 6 shows a top perspective view of the assembly in FIG. 5, wherein the top cover 7 is removed.

FIG. 7 illustrates a top perspective view of the connector 3 of the connector assembly 2 on which the printed circuit board 21 is provided. On the printed circuit board 21 the transmitter 45 implemented with a multiple channel optical transmitter (TX) and the receiver 46 implemented with a multiple channel optical receiver (RX) are located. The multiple channel optical transmitter (TX) and the multiple channel optical receiver (RX) are mounted by the so-called flip-chip technology. Different from other technologies like wire bonding, this allows for direct coupling of peripheral components, e.g. cooling modules, to the integrated circuits of the multiple channel optical transmitter (TX) and/or the multiple channel optical receiver (RX).

FIG. 8 illustrates the optical transceiver system from FIG. 4 in part. In FIG. 8, the optical coupling unit 20, the connector 31, and the printed circuit board 21 receiving the transceiver components are depicted.

FIG. 9 illustrates a perspective section view of the assembly in FIG. 1, wherein the top cover 7 is removed.

FIG. 10 shows a perspective view of the connector 31. Also, FIG. 11 shows a top perspective view of the connector 31. On the front face 40, the lenses 41 are provided. Pin holes 110 are provided for receiving locating or alignment pins 120 (see FIG. 12 below).

In a ferrule design known as such, e.g. the so-called MT ferrule design, front end faces of the optical fibers are polished. Such polished fiber front faces may be used together with the ferrule lenses 41. As an alternative, it is proposed to provide the ferrule lenses 41 in front of unpolished fiber end portions. In one embodiment, such unpolished end portion are provided by braking the optical fiber after FIG. 12 shows a top perspective view of an assembly where the optical coupling unit 20 is provided on the receptacle 4. The alignment pins 120 are provided for aligning the connector 31 when it is received by a reception 121 on the coupling unit 20. When the connector 31 is connected to the coupling unit 20, the connector lenses 41 and the first coupling unit lenses 42 are facing each other.

FIG. 13 illustrates a perspective top view of the receptacle 4. Receiving elements 130 being part of the pin connections 47 (see FIG. 4) are depicted.

FIGS. 14, 15 and 16 show perspective views of the optical coupling unit 20. Referring to FIG. 16, the second coupling unit lenses 44 are provided at the bottom of the optical coupling unit 20.

FIGS. 17 and 18 show perspective views of assemblies comprising the optical coupling unit 20 and the printed circuit board 21. In FIG. 18, the top cover 7 and the connector 31 are illustrated in addition.

Finally, FIG. 19 shows a top perspective view of an optical communication system 190 comprising a PCB motherboard 191 (PCB—Printed Circuit Board) on which four optical transceiver systems 192 which may be implemented as described above are provided.

The features disclosed in this specification and/or the figures may be material for the realization of the invention in its various embodiments, taken in isolation or in various combinations thereof.

The invention claimed is:

1. An optical communications system, comprising:
an optical module, comprising
a module motherboard provided with a substrate having an upper surface and a lower surface,
an optical component disposed on the upper surface of the substrate, the optical component being configured to submit and/or receive optical signals and being connected to electrical conductors extending through the substrate,
an optical coupling module having a first light coupling port, a second light coupling port, and at least one light guiding component guiding light signals between the first and second light coupling ports, and
a connector receptacle, a longitudinal axis of the connector receptacle being provided with an acute angle to the plane of the substrate, and
a fiber cable connector provided on an end portion of an optical fiber cable and received in the connector receptacle, thereby, optically coupling a plurality of optical fibers of the optical fiber cable to the first or second light coupling ports.

2. System according to claim 1, the connector receptacle comprises a module receptacle provided in the optical coupling module.

3. System according to claim 1, further comprising a housing, the fiber cable connector being provided with a fiber cable extension support extending from the housing.

4. System according to claim 1, wherein the fiber cable connector is fixed by a latching mechanism in the connector receptacle.

5. System according to claim 1, wherein at least a coupling module portion extending between the first and second light coupling ports in the optical coupling module is provided as molded module part.

6. System according to claim 5, wherein the molded module part comprises an integrally plurality of optical lenses provided at least one of the first and the second light coupling ports.

7. System according to claim 1, wherein the at least one light guiding component comprises a light reflecting component provided with an obtuse light reflection angle.

8. System according to claim 1, further comprising a plurality of optical lenses provided in front of fiber cable end surfaces in the fiber cable connector.

9. System according to claim 1, wherein fiber end surfaces in the fiber cable connector are one of polished fiber front end surfaces and broken fiber front end surfaces.

10. System according to claim 1, further comprising a connector assembly having an upper mounting surface and a lower mounting surface and a connector assembly motherboard receiving at least one electronic component assigned to the at least one optical component of the optical module and electrically connected to conductors on the upper and/or the lower mounting surfaces, the optical module being provided on the upper mounting surface and electrically connected to the conductors on the upper mounting surface.

11. System according to claim 10, wherein the connector assembly comprises an assembly connector providing the upper mounting surface and an assembly receptacle providing the lower mounting surface and being releasable connected to the assembly connector.

12. System according to claim 10, wherein the connector assembly comprises a Meg-Array assembly.

13. An optical module, comprising:
- a motherboard comprising a substrate having an upper surface and a lower surface,
- an optical component disposed on the upper surface of the substrate, the optical component being configured to submit and I or receive optical signals and being connected to electrical conductors extending through the substrate,
- an optical coupling module having a first light coupling port, a second light coupling port, and at least one light guiding component guiding light signals between the first and second light coupling ports, and
- a connector receptacle configured to receive a fiber cable connector provided on an end portion of an optical fiber cable, thereby, coupling a plurality of optical fibers to the first or second light coupling ports, a longitudinal axis of the connector receptacle being provided with an acute angle to the plane of the substrate.

14. A method for mounting an optical communications system, the method comprising steps of:
providing an optical module, comprising
- a module motherboard provided with a substrate having an upper surface and a lower surface,
- an optical component disposed on the upper surface of the substrate, the optical component being configured to submit and/or receive optical signals and being connected to electrical conductors extending through the substrate,
- an optical coupling module having a first light coupling port, a second light coupling port, and at least one light guiding component guiding light signals between the first and second light coupling ports, and
- a connector receptacle, a longitudinal axis of the connector receptacle being provided with an acute angle to the plane of the substrate,
providing a fiber cable connector provided on an end portion of an optical fiber cable, and
receiving the fiber cable connector in the connector receptacle, thereby, optically coupling a plurality of optical fibers of the optical fiber cable to the first or second light coupling ports, the fiber cable connector being received in the connector receptacle in a position in which a longitudinal axis of the fiber cable connector is provided with an acute angle to the plane of the substrate.

* * * * *

UNITED STATES PATENT AND TRADEMARK OFFICE
CERTIFICATE OF CORRECTION

PATENT NO. : 9,128,257 B2  
APPLICATION NO. : 13/980183  
DATED : September 8, 2015  
INVENTOR(S) : Otte et al.

Page 1 of 1

It is certified that error appears in the above-identified patent and that said Letters Patent is hereby corrected as shown below:

In the claims

Claim 13, col. 9, line 8 "and I or" should be deleted and --and/or-- should be inserted.

Signed and Sealed this
Fifteenth Day of December, 2015

Michelle K. Lee
*Director of the United States Patent and Trademark Office*